United States Patent
Tracy et al.

(10) Patent No.: US 7,382,606 B2
(45) Date of Patent: Jun. 3, 2008

(54) COMPUTER DEVICE WITH ANTI-TIP MECHANISM

(75) Inventors: Mark S. Tracy, Tomball, TX (US); Paul J. Doczy, Cypress, TX (US); Walter J. Rankins, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 12 days.

(21) Appl. No.: 11/157,777

(22) Filed: Jun. 21, 2005

(65) Prior Publication Data

US 2006/0285285 A1 Dec. 21, 2006

(51) Int. Cl.
*G06F 1/16* (2006.01)
(52) U.S. Cl. ............... 361/683; 312/223.3; 345/156
(58) Field of Classification Search ........ 361/679–687, 361/724–727; 312/223.1–223.7; 348/220; 345/156–157
See application file for complete search history.

(56) References Cited

U.S. PATENT DOCUMENTS

| 5,229,920 | A | | 7/1993 | Spaniol et al. | |
|---|---|---|---|---|---|
| 5,646,820 | A | * | 7/1997 | Honda et al. | 361/683 |
| 5,729,429 | A | | 3/1998 | Margaritis et al. | |
| 6,198,624 | B1 | | 3/2001 | Margaritis | |
| 6,665,175 | B1 | * | 12/2003 | deBoer et al. | 361/681 |
| 6,680,845 | B2 | * | 1/2004 | Agata et al. | 361/683 |
| 6,870,730 | B2 | * | 3/2005 | Riddiford | 361/681 |
| 2004/0114315 | A1 | * | 6/2004 | Anlauff | 361/681 |
| 2006/0203437 | A1 | * | 9/2006 | Lev et al. | 361/681 |

* cited by examiner

*Primary Examiner*—Hung V Duong

(57) ABSTRACT

A computer device comprising a display member rotatably coupled to a base member to enable variable positioning of the display member relative to the base member about an axis. The computer device further comprises an anti-tip mechanism extending rearwardly from at least a portion of a bottom wall of the base member beyond the axis to resist movement of the base member away from a support surface.

24 Claims, 2 Drawing Sheets

COMPUTER DEVICE WITH ANTI-TIP MECHANISM

BACKGROUND OF THE INVENTION

Computer devices such as notebook and/or laptop computers generally comprise a base member coupled to a display member by a hinge. The hinge generally comprises a friction clutch so that when opening the display member, frictional torque can be used to maintain the display at a user-selected viewing angle. However, if the computer device is new or during instances when the display member has not been moved for a period of time, a static "break-away" torque generally makes it difficult to open or move the display member. In some instances the "break-away" torque can cause the base member to tip/lift from a support surface. Further, computer devices having less weight generally have less mass to counter the tipping/lifting effect.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-6 of the drawings, like numerals being used for like and corresponding parts of the various drawings.

Figure 1:
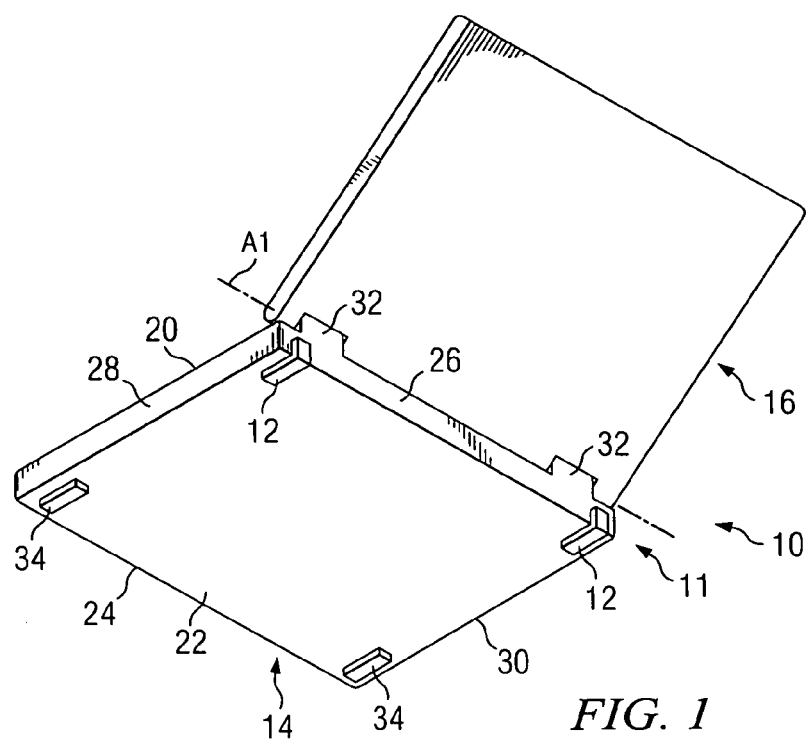
FIG. 1 is a bottom perspective view of a computer device in which an embodiment of an anti-tip mechanism in accordance with the present invention is employed to advantage.

FIG. 1 is a diagram illustrating an embodiment of a computer device 10 comprising an anti-tip mechanism 11 in accordance with the present invention. In the embodiment illustrated in FIG. 1, anti-tip mechanism 11 comprises a plurality of supports 12 coupled to a base member 14. Base member 14 is coupled to a display member 16 to enable variable positioning of display member 16 about an axis Al relative to base member 14 by hinges 32. In the embodiment illustrated in FIG. 1, base member 14 comprises a top wall 20, a bottom wall 22, a front wall 24, a rear wall 26 and a pair of sidewalls 28 and 30. In the embodiment illustrated in FIG. 1, supports 12, along with a plurality of supports 34, support base member 14 on a working surface (e.g., a desktop, table, etc.) so that base member 14 is generally supported in a parallel orientation with respect to the working surface. Preferably, supports 12 and 34 prevent bottom wall 22 from scratching or otherwise damaging the working surface while also frictionally engaging the working surface to reduce or eliminate sliding of computer device 10 with respect to the working surface. In accordance with one embodiment of the present invention, supports 12 and 34 are fabricated from rubber; however, it should be understood that other materials may be used to form supports 12 and 34. In the embodiment illustrated in FIG. 1, two each of supports 12 and 34 are used. However, it should be understood that a greater or fewer quantity of either of supports 12 and 34 may be used. Supports 12 and/or 34 can be attached to base member 14 by a fastening mechanism such as an adhesive, a screw, a hook and loop fastener, or other type of fastening device and/or element. Supports 12 and/or 34 may alternatively be formed integrally with base member 14.

Figure 2A:
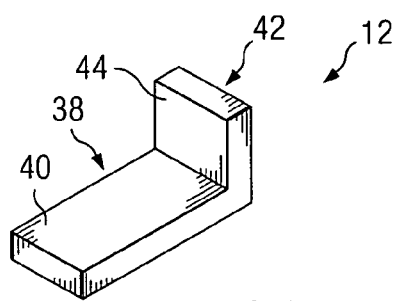
FIG. 2A is a front perspective view of an embodiment of an anti-tip mechanism illustrated in FIG. 1.

FIG. 2A is a diagram illustrating an embodiment of a single support 12 in accordance with the present invention. In the embodiment illustrated in FIG. 2A, support 12 comprises a base portion 38 comprising a generally planar surface 40 and an upright portion 42 comprising a generally planar surface 44 and extending in a generally perpendicular direction relative to base portion 38. Planar surfaces 40 and 44 are adapted to be seated against bottom wall 22 and rear wall 26, respectively, of base member 14 (FIG. 1).

Figure 2B:
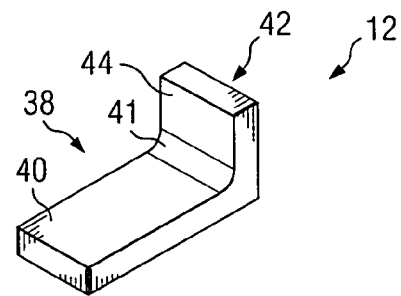
FIG. 2B is a front perspective view of another embodiment of an anti-tip mechanism in accordance with the present invention.
Figure 2C:
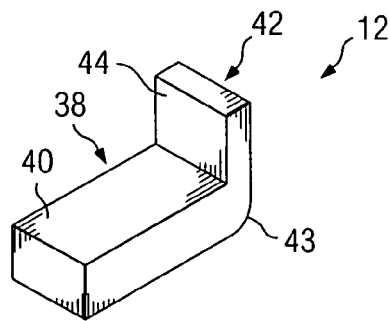
FIG. 2C is a front perspective view of another embodiment of an anti-tip mechanism in accordance with the present invention.

FIGS. 2B and 2C are diagrams illustrating additional embodiments of support 12 in accordance with the present invention. In the embodiment illustrated in FIG. 2B, support 12 comprises an inner radiused portion 41 adapted to cooperate and/or otherwise engage a geometrically complementary surface that may be formed on base member 14 at the intersection of rear wall 26 and bottom wall 22. In the embodiment illustrated in FIG. 2C, support 12 comprises an outer radiused portion 43. Additionally, in the embodiment illustrated in FIG. 2C, base portion 38 is formed having a thickness greater than a thickness of upright portion 42. Thus, it should be understood that support 12 may be configured having a variety of geometric shapes and/or configurations (e.g., with both inner and outer radiused portions and/or varying thicknesses, shapes, etc.).

Figure 3:
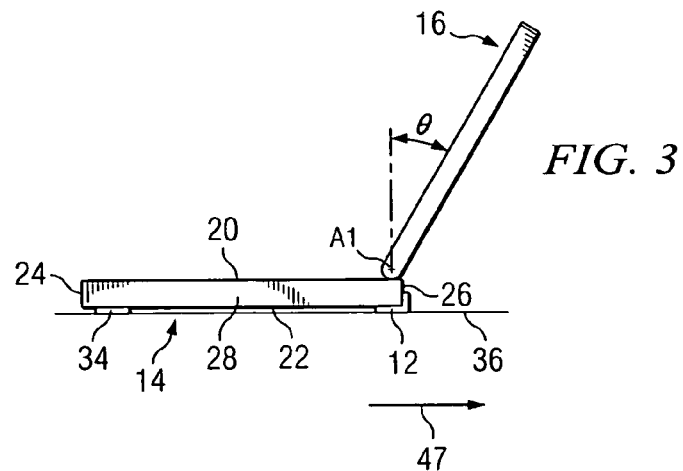
FIG. 3 is a side view of the computer device of FIG. 1 in an open position.

FIG. 3 is a diagram illustrating an embodiment of computer device 10 with display member 16 disposed in an open position relative to base member 14 in accordance with the present invention. In the embodiment illustrated in FIG. 3, display member 16 is oriented at a desired user-selected angle θ such that display member 16 is generally disposed in an upright position with respect to base member 14. One or more friction clutches disposed inside hinges 32 (FIG. 1) maintain display member 16 at the user-desired viewing angle θ.

In the embodiment illustrated in FIG. 3, each support 12 is securely fastened to base member 14 so that at least portion of each support 12 extends rearwardly in the direction indicated generally by arrow 47 beyond axis A1. Support 12 is formed to extend rearwardly beyond axis A1 a predetermined distance based on, for example, the dimensions of base member 14 and/or display member 16, the frictional forces of any clutch members associated with hinges 32, the weight of base member 14 and/or display member 16, and/or any other factor generally associated with causing base member 14 to lift/tip from a working or support surface. Thus, by having support 12 extend rearwardly beyond axis A1 a predetermined distance, the fulcrum or axis of rotation of device 10 as a whole is moved rearwardly, thereby increasing the effective length of base member 14 in the direction indicated by arrow 47 and requiring a greater force to lift/tip base member away from a support surface. Further, by having support 12 extend rearwardly beyond axis A1 a predetermined distance, the fulcrum or axis of rotation of device 10 as a whole is moved rearwardly, thereby reducing the effect of a moment arm associated with a force applied to and/or resulting from display member 16 (e.g., by a user moving display member 16 in the direction indicated by arrow 47 and/or by the weight of display member 16).

Figure 4:
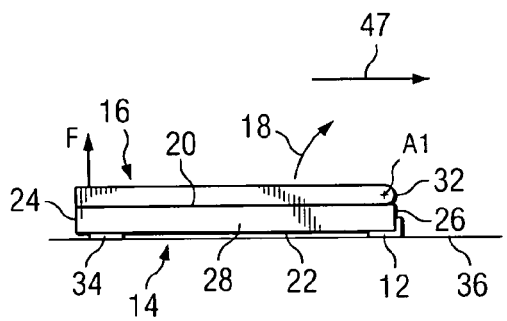
FIG. 4 is a side view of the computer device of FIG. 1 in the closed position.

FIG. 4 is a diagram illustrating computer device 10 with display member 16 in the closed position relative to base member 14 in accordance with the present invention wherein display member 16 is generally disposed adjacent and parallel to base member 14. In operation, to transition display member 16 from the closed position (FIG. 4) to a user desired viewing angle θ (FIG. 3), a force F is applied to display member 14 to rotate display member 16 in the direction of arrow 18 relative to base member 16. During rotation, supports 12 prevent or substantially reduce the likelihood of tipping/lifting of base member 14 relative to working surface 36 caused, for example, by the resistive forces from the friction clutches in hinges 32.

Figure 5:
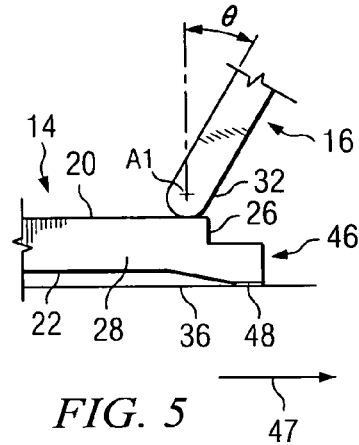
FIG. 5 is a diagram of a computer device employing another embodiment of an anti-tip mechanism in accordance with the present invention.

FIG. 5 is a diagram illustrating computer device 10 with another embodiment of anti-tip mechanism 11 in accordance with the present invention. In the embodiment illustrated in FIG. 5, anti-tip mechanism 11 comprises an extension 46 extending rearwardly of axis A1 a predetermined distance in the direction indicated by arrow 47. In the embodiment illustrated in FIG. 5, extension 46 is formed molded or integral with base member 14 (e.g., formed as a unitary or single structure of base member 14) and protrudes from rear wall 26 of base member 14 and from bottom wall 22 rearwardly beyond axis A1 in the direction of arrow 47. However, it should be understood that extension 46 may be formed as a separately attachable component or element. In the embodiment illustrated in FIG. 5, a support 48 (e.g., a rubber pad) is mounted to extension 46 to prevent electronic device 10 from sliding during use. Accordingly, by providing extension 46 extending rearwardly beyond axis A1, the likelihood of base member 14 lifting/tipping relative to working surface 36 is substantially reduced or eliminated.

Figure 6:
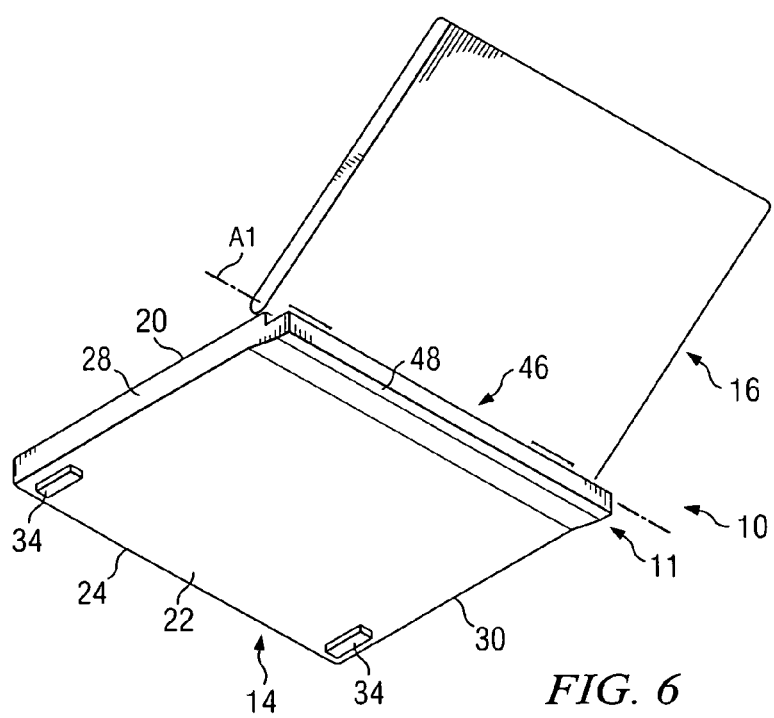
FIG. 6 is a bottom perspective view of the computer device illustrated in FIG. 5.

FIG. 6 is a diagram illustrating computer device 10 having one embodiment of extension 46 in accordance with the present invention. In the embodiment illustrated in FIG. 6, extension 46 extends substantially the entire width or lateral dimension of base member 14 (e.g., the entire lateral dimension or nearly the entire lateral dimension of base member 14). However, it should be understood that in other embodiments of the present invention, extension 46 may be formed having smaller, spaced apart portions extending rearwardly of axis A1.

Thus, embodiments of the present invention provide a computer device 10 comprising an anti-tipping mechanism 11 that prevents or substantially reduces the likelihood of lifting and/or tipping of base member 14 away from a support surface when transitioning the computer device 10 from the closed position to the open position or in response to adjusting display member 16 to a desired viewing angle θ. Further, anti-tipping mechanism 11 prevents or substantially reduces the likelihood of lifting and/or tipping of base member 14 caused by a weight and/or length of the display member 16.

What is claimed is:

1. A computer device comprising:
  a display member rotatably coupled to a base member to enable positioning of the display member relative to the base member about an axis; and
  an anti-tip mechanism extending from at least a portion of a bottom wall of the base member and extending from at least a portion of a rear wall of the base member, the anti-tip mechanism extending rearwardly beyond the axis to resist movement of the base member away from a support surface.

2. The computer device of claim 1, wherein the anti-tip mechanism is coupled to a rear wall of the base member.

3. The computer device of claim 1, wherein the anti-tip mechanism comprises a base portion couplable to the bottom wall of the base member.

4. The computer device of claim 1, wherein the anti-tip mechanism comprises an upright portion couplable to a rear wall of the base member.

5. The computer device of claim 1, wherein the anti-tip mechanism is molded integral with the base member.

6. The computer device of claim 1, wherein the anti-tip mechanism extends rearwardly from the base member a predetermined distance.

7. A method of manufacturing a computer device, comprising:
  coupling a display member to a base member to enable variable positioning of the display member relative to the base member about an axis; and
  providing an anti-tip mechanism extending from at least a portion of a bottom wall of the base member and extending from at least a portion of a rear wall of the base member, the anti-tip mechanism extending rearwardly beyond the axis to resist movement of the base member away from a support surface.

8. The method of claim 7, wherein providing the anti-tip mechanism comprises coupling the anti-tip mechanism to a rear wall of the base member.

9. The method of claim 7, wherein providing the anti-tip mechanism comprises providing the anti-tip mechanism having a base portion couplable to the bottom wall of the base member.

10. The method of claim 9, wherein providing the anti-tip mechanism comprising providing the anti-tip mechanism having an upright portion couplable to the rear wall of the base member.

11. The method of claim 7 wherein providing the anti-tip mechanism comprises forming the anti-tip mechanism integral with the base member.

12. The method of claim 7 wherein providing the anti-tip mechanism comprises extending the anti-tip mechanism rearwardly from the base member a predetermined distance.

13. A computer device comprising:
  means for coupling a display member to a base member to enable variable positioning of the display member relative to the base member about an axis; and
  means, extending from at least a portion of a bottom wall and extending from at least a portion of a rear wall of the base member, for resisting movement of the base member away from a support surface, the means for resisting movement extending rearwardly beyond the axis.

14. The computer device of claim 13, where the extending means is couplable to a rear wall of the base member.

15. The computer device of claim 13, wherein the extending means is formed integral with the base member.

16. The computer device of claim 13, wherein the extending means extends substantially across a lateral dimension of the base member.

17. The computer device of claim 13, wherein the extending means extends rearwardly from the base member a predetermined distance.

18. A computer device comprising:
a display member rotatably coupled to a base member to enable positioning of the display member relative to the base member about an axis;
an anti-tip mechanism extending rearwardly from at least a portion of a bottom wall of the base member beyond the axis movement of the base member away from a support surface, wherein the anti-tip mechanism is molded integral with the base member.

19. The computer device of claim 18, wherein the anti-tip mechanism comprises an upright portion extending from the rear wall of the base member.

20. The computer device of claim 18, wherein the anti-tip mechanism extends rearwardly from the base member a predetermined distance.

21. A computer device comprising:
a display member rotatably coupled to a base member to enable positioning of the display member relative to the base member about an axis; and
a plurality of supports disposed on a bottom wall of the base member and configured to reduce sliding of the base member relative to a support surface, at least one of the supports extending rearwardly beyond the axis to resist movement of the base member away from the support surface.

22. The computer device of claim 21, wherein the plurality of supports comprise rubber supports.

23. The computer device of claim 21, wherein the at least one support extends upwardly along at least a portion of a rear wall of the base member.

24. The computer device of claim 21, wherein the at least one support extends substantially a lateral of the base member.

* * * * *

UNITED STATES PATENT AND TRADEMARK OFFICE
CERTIFICATE OF CORRECTION

PATENT NO. : 7,382,606 B2
APPLICATION NO. : 11/157777
DATED : June 3, 2008
INVENTOR(S) : Mark S. Tracy et al.

It is certified that error appears in the above-identified patent and that said Letters Patent is hereby corrected as shown below:

In column 4, line 13, in Claim 2, delete "a" and insert -- the --, therefor.

In column 4, line 18, in Claim 4, delete "a" and insert -- the --, therefor.

In column 4, line 38, in Claim 8, delete "a" and insert -- the -- therefor.

In column 4, line 45, in Claim 10, delete "comprising" and insert -- comprises --, therefor.

In column 4, line 65, in Claim 14, delete "a" and insert -- the --, therefor.

In column 5, line 13, in Claim 18, after "axis" insert -- to resist --.

In column 6, line 18, in Claim 24, after "lateral" insert -- width --.

Signed and Sealed this

Twenty-fourth Day of March, 2009

JOHN DOLL
*Acting Director of the United States Patent and Trademark Office*